US009547366B2

(12) United States Patent
Ullrich et al.

(10) Patent No.: US 9,547,366 B2
(45) Date of Patent: Jan. 17, 2017

(54) SYSTEMS AND METHODS FOR HAPTIC AND GESTURE-DRIVEN PAPER SIMULATION

(71) Applicants: Christopher J. Ullrich, Ventura, CA (US); David M. Birnbaum, Oakland, CA (US); Marcus Aurelius Bothsa, Visakhapatnam (IN)

(72) Inventors: Christopher J. Ullrich, Ventura, CA (US); David M. Birnbaum, Oakland, CA (US); Marcus Aurelius Bothsa, Visakhapatnam (IN)

(73) Assignee: Immersion Corporation, San Jose, CA (US)

( * ) Notice: Subject to any disclaimer, the term of this patent is extended or adjusted under 35 U.S.C. 154(b) by 241 days.

(21) Appl. No.: 13/827,951

(22) Filed: Mar. 14, 2013

(65) Prior Publication Data

US 2014/0281954 A1    Sep. 18, 2014

(51) Int. Cl.
*G06F 3/01*    (2006.01)
*G06F 3/0483*    (2013.01)
(Continued)

(52) U.S. Cl.
CPC ............ *G06F 3/016* (2013.01); *G06F 3/0483* (2013.01); *G06F 3/04883* (2013.01);
(Continued)

(58) Field of Classification Search
CPC .. G06F 1/1626; G06F 1/1684; G06F 3/04883; G06F 3/0483; G06F 3/016
(Continued)

(56) References Cited

U.S. PATENT DOCUMENTS 3,618,070 A    11/1971    Kagan
3,911,416 A    10/1975    Feder
(Continued)

FOREIGN PATENT DOCUMENTS

JP    2009-223875    10/2009
WO    WO 95/20787    8/1995
(Continued)

OTHER PUBLICATIONS

Curry, K., Supporting Collaborative Interaction in Tele-Immersion, Thesis submitted to the Faculty of the Virginia Polytechnic Institute and the State University in partial fulfillment of the requirements for the degree of Master of Science in Computer Science and Applications, 1998.
Dennerlein, J. et al., Vibrotactile Feedback for Industrial Telemanipulators, Presented at the Sixth Annual Symposium on Haptic Interfaces for Virtual Environment and Teleoperator Systems, ASME IMECE, Dallas, Texas, Nov. 15-21, 199.
Eberhardt, S. et al., Force Reflection for Wimps: A Button Acquisition Experiment, Proceedings of the ASME Dynamic Systems and Control Division, presented at eh 1997 ASME Internaational Mechanical Engineering Congress and Exposition, Nov. 16-21, 1997, Dallas, Texas.
(Continued)

*Primary Examiner* — Haoshian Shih
(74) *Attorney, Agent, or Firm* — Kilpatrick Townsend & Stockton, LLP

(57) ABSTRACT

Systems and methods for haptic and gesture-driven paper simulation are disclosed. For example, one disclosed method includes the steps of receiving an electronic document; receiving metadata associated with the electronic document, the metadata comprising a characteristic indicating a type of paper; generating and transmitting a display signal configured to cause display of the at least a portion of the document; and generating and transmitting a haptic signal based on the type of paper, the haptic signal configured to cause a haptic output device to generate a haptic effect.

29 Claims, 10 Drawing Sheets

(51) Int. Cl.
*G06F 3/0488* (2013.01)
*G06F 15/02* (2006.01)
*G06F 1/16* (2006.01)

(52) U.S. Cl.
CPC ........ *G06F 15/0291* (2013.01); *G06F 1/1626* (2013.01); *G06F 1/1684* (2013.01)

(58) Field of Classification Search
USPC .................. 715/702, 776; 345/156, 173, 179
See application file for complete search history.

(56) References Cited

U.S. PATENT DOCUMENTS

| | | |
|---|---|---|
| 4,028,502 A | 6/1977 | Moricca et al. |
| 4,127,752 A | 11/1978 | Lowthorp |
| 4,227,319 A | 10/1980 | Guy et al. |
| 4,262,549 A | 4/1981 | Schwellenbach |
| 4,278,920 A | 7/1981 | Ruoff, Jr. |
| 4,333,070 A | 6/1982 | Barnes |
| 4,352,091 A | 9/1982 | Yamasaki |
| 4,421,953 A | 12/1983 | Zielinski |
| 4,436,188 A | 3/1984 | Jones |
| 4,464,117 A | 8/1984 | Foerst |
| 4,484,191 A | 11/1984 | Vavra |
| 4,581,972 A | 4/1986 | Hoshino |
| 4,603,284 A | 7/1986 | Perzley |
| 4,692,756 A | 9/1987 | Clark |
| 4,782,327 A | 11/1988 | Kley et al. |
| 4,791,416 A | 12/1988 | Adler |
| 4,794,392 A | 12/1988 | Selinko |
| 4,798,919 A | 1/1989 | Miessler et al. |
| 4,821,030 A | 4/1989 | Batson et al. |
| 4,823,634 A | 4/1989 | Culver |
| 4,853,674 A | 8/1989 | Kiss |
| 4,918,438 A | 4/1990 | Yamasaki |
| 4,931,765 A | 6/1990 | Rollins et al. |
| 4,964,004 A | 10/1990 | Barker |
| 4,983,786 A | 1/1991 | Stevens et al. |
| 5,003,984 A | 4/1991 | Muraki et al. |
| 5,053,585 A | 10/1991 | Yaniger |
| 5,086,296 A | 2/1992 | Clark |
| 5,117,449 A | 5/1992 | Metroka et al. |
| 5,165,897 A | 11/1992 | Johnson |
| 5,175,459 A | 12/1992 | Danial et al. |
| 5,189,389 A | 2/1993 | DeLuca et al. |
| 5,237,327 A | 8/1993 | Saitoh et al. |
| 5,241,308 A | 8/1993 | Young |
| 5,283,970 A | 2/1994 | Aigner |
| 5,293,158 A | 3/1994 | Soma |
| 5,355,148 A | 10/1994 | Anderson |
| 5,366,376 A | 11/1994 | Copperman et al. |
| 5,368,484 A | 11/1994 | Copperman et al. |
| 5,414,337 A | 5/1995 | Schuler |
| 5,436,622 A | 7/1995 | Gutman et al. |
| 5,437,607 A | 8/1995 | Taylor |
| 5,459,382 A | 10/1995 | Jacobus et al. |
| 5,482,051 A | 1/1996 | Reddy et al. |
| 5,489,812 A | 2/1996 | Furuhata et al. |
| 5,496,174 A | 3/1996 | Garner |
| 5,506,605 A | 4/1996 | Paley |
| 5,508,688 A | 4/1996 | Mochizuki |
| 5,521,336 A | 5/1996 | Buchanan et al. |
| 5,575,761 A | 11/1996 | Hajianpour |
| 5,619,181 A | 4/1997 | Murray |
| 5,625,576 A | 4/1997 | Massie et al. |
| 5,642,413 A | 6/1997 | Little |
| 5,646,589 A | 7/1997 | Murray et al. |
| 5,666,473 A | 9/1997 | Wallace |
| 5,692,956 A | 12/1997 | Rifkin |
| 5,696,497 A | 12/1997 | Mottier et al. |
| 5,729,249 A | 3/1998 | Yasutake |
| 5,729,589 A | 3/1998 | Samson |
| 5,754,096 A | 5/1998 | Muto et al. |
| 5,757,280 A | 5/1998 | Motohashi |
| 5,764,751 A | 6/1998 | Konishi |
| 5,767,457 A | 6/1998 | Gerpheide et al. |
| 5,767,787 A | 6/1998 | Kudoh et al. |
| 5,816,823 A | 10/1998 | Naimark et al. |
| 5,844,392 A | 12/1998 | Peurach et al. |
| 5,844,498 A | 12/1998 | Ide |
| 5,867,796 A | 2/1999 | Inutsuka |
| 5,873,024 A | 2/1999 | Suzuki |
| 5,887,995 A | 3/1999 | Holehan |
| 5,889,670 A | 3/1999 | Schuler et al. |
| 5,917,906 A | 6/1999 | Thornton |
| 5,943,044 A | 8/1999 | Martinelli et al. |
| 5,955,964 A | 9/1999 | Tada |
| 5,956,484 A | 9/1999 | Rosenberg et al. |
| 5,966,655 A | 10/1999 | Hardouin |
| 5,973,689 A | 10/1999 | Gallery |
| 5,988,902 A | 11/1999 | Holehan |
| 6,014,572 A | 1/2000 | Takahashi |
| 6,046,726 A | 4/2000 | Keyson |
| 6,091,321 A | 7/2000 | Karell |
| 6,113,459 A | 9/2000 | Nammoto |
| 6,118,979 A | 9/2000 | Powell |
| 6,131,097 A | 10/2000 | Peurach et al. |
| 6,175,721 B1 | 1/2001 | Hayato |
| 6,218,958 B1 | 4/2001 | Eichstaedt et al. |
| 6,218,966 B1 | 4/2001 | Goodwin et al. |
| 6,225,976 B1 | 5/2001 | Yates et al. |
| 6,272,319 B1 | 8/2001 | Narusawa |
| 6,300,938 B1 | 10/2001 | Culver |
| 6,307,465 B1 | 10/2001 | Kayama et al. |
| 6,373,463 B1 | 4/2002 | Beeks |
| 6,374,255 B1 | 4/2002 | Peurach et al. |
| 6,418,323 B1 | 7/2002 | Bright et al. |
| 6,424,251 B1 | 7/2002 | Byrne |
| 6,433,771 B1 | 8/2002 | Yocum et al. |
| 6,448,977 B1 | 9/2002 | Braun et al. |
| 6,563,487 B2 | 5/2003 | Martin et al. |
| 6,574,489 B1 | 6/2003 | Uriya |
| 6,650,338 B1 | 11/2003 | Kolarov et al. |
| 6,686,901 B2 | 2/2004 | Rosenberg |
| 6,819,312 B2 | 11/2004 | Fish |
| 6,864,877 B2 | 3/2005 | Braun et al. |
| 7,292,227 B2 | 11/2007 | Fukumoto et al. |
| 7,319,466 B1 * | 1/2008 | Tarr et al. ..................... 345/419 |
| 8,018,431 B1 * | 9/2011 | Zehr et al. ..................... 345/156 |
| 8,405,618 B2 * | 3/2013 | Colgate et al. ............... 345/173 |
| 8,416,066 B2 * | 4/2013 | Westerinen et al. ........ 340/407.2 |
| 8,704,776 B2 * | 4/2014 | Kim .............................. 345/173 |
| 8,723,820 B1 * | 5/2014 | Han .............................. 345/173 |
| 8,799,827 B2 * | 8/2014 | Hinckley et al. ............. 715/863 |
| 2002/0145512 A1 | 10/2002 | Sleichter, III et al. |
| 2002/0149561 A1 | 10/2002 | Fukumoto et al. |
| 2003/0030619 A1 | 2/2003 | Martin et al. |
| 2003/0090460 A1 | 5/2003 | Schena et al. |
| 2003/0122658 A1 | 7/2003 | Takahashi |
| 2003/0169151 A1 | 9/2003 | Ebling et al. |
| 2003/0188594 A1 | 10/2003 | Levin et al. |
| 2003/0222766 A1 | 12/2003 | Rollins et al. |
| 2004/0014484 A1 | 1/2004 | Kawashima |
| 2004/0056840 A1 | 3/2004 | Goldenburg et al. |
| 2005/0093847 A1 | 5/2005 | Altkorn et al. |
| 2005/0109145 A1 | 5/2005 | Levin et al. |
| 2005/0138541 A1 * | 6/2005 | Euchner et al. ............... 715/512 |
| 2005/0162383 A1 | 7/2005 | Rosenberg |
| 2007/0005790 A1 * | 1/2007 | Chang et al. ................. 709/231 |
| 2008/0303782 A1 * | 12/2008 | Grant et al. ................... 345/156 |
| 2010/0017759 A1 * | 1/2010 | Birnbaum et al. ............ 715/863 |
| 2010/0073304 A1 * | 3/2010 | Grant et al. ................... 345/173 |
| 2010/0120470 A1 * | 5/2010 | Kim et al. ..................... 455/566 |
| 2010/0182285 A1 * | 7/2010 | Tremblay ...................... 345/179 |
| 2010/0188327 A1 * | 7/2010 | Frid et al. ..................... 345/156 |
| 2010/0231550 A1 * | 9/2010 | Cruz-Hernandez et al. . 345/174 |
| 2010/0248200 A1 * | 9/2010 | Ladak et al. .................. 434/262 |
| 2010/0267424 A1 * | 10/2010 | Kim et al. ..................... 455/566 |
| 2011/0025609 A1 * | 2/2011 | Modarres et al. ............ 345/173 |
| 2011/0102349 A1 * | 5/2011 | Harris ........................... 345/173 |
| 2012/0028577 A1 * | 2/2012 | Rodriguez et al. .......... 455/41.1 |
| 2012/0038582 A1 | 2/2012 | Grant |
| 2012/0056825 A1 * | 3/2012 | Ramsay et al. ............... 345/173 |
| 2012/0086564 A1 * | 4/2012 | Sinha .......................... 340/407.1 |

(56) References Cited

U.S. PATENT DOCUMENTS

| | | | |
|---|---|---|---|
| 2012/0127088 A1* | 5/2012 | Pance et al. | 345/173 |
| 2012/0131492 A1* | 5/2012 | Jung | 715/776 |
| 2012/0180001 A1* | 7/2012 | Griffin et al. | 715/863 |
| 2012/0268412 A1 | 10/2012 | Cruz-Hernandez et al. | |
| 2013/0009892 A1 | 1/2013 | Salmela | |
| 2013/0021281 A1 | 1/2013 | Tse et al. | |
| 2013/0222311 A1* | 8/2013 | Pesonen | 345/173 |
| 2013/0229371 A1* | 9/2013 | Lee et al. | 345/173 |
| 2013/0246222 A1* | 9/2013 | Weerasinghe | 705/26.62 |
| 2013/0307829 A1* | 11/2013 | Libin | 345/179 |
| 2013/0311881 A1 | 11/2013 | Birnbaum et al. | |
| 2013/0314341 A1* | 11/2013 | Lee et al. | 345/173 |
| 2014/0258833 A1* | 9/2014 | Hamilton et al. | 715/234 |

FOREIGN PATENT DOCUMENTS

| | | |
|---|---|---|
| WO | WO 97/18546 | 5/1997 |
| WO | WO 01/91100 | 11/2001 |

OTHER PUBLICATIONS

IEEE International Conference on Robotics and Automation, May 16-20, 1998, Lueven, Belgium.

Hayward, V. et al., Parameter Sensitivity Analysis for Design and Control of Force Transmission Systems, McGill University Center for Intelligent Machines, 3480 University Street, Montreal, Quebec.

Kim, W., Telemanipulator Technology and Space Telerobotics, Proceedings from SPIE—The International Society for Optical Engineering, Sep. 7-9, 1993, Boston, Mass.

Kontarinis, D. et al., Tactile Display of Vibratory Information in Teleoperation and Virtual Environments, Presence, vol. 4, No. 4, Fall 1995, pp. 387-402.

Kontarinis, D. et al., Display of High-Frequency Tactile Information to Teleoperators, Harvard University Division of Applied Sciences, Cambridge, Mass.

MacLean, K., Designing with Haptic Feedback, Symposium on Haptic Feedback in the Proceedings of the IEEE Conference on Robotics and Automation, Apr. 22-28, 2000.

Marcus, B., Touch Feedback in Surgery, Official Proceedings of Virtual Reality and Medicine the Cutting Edge, Sep. 8-11, 1994, The New York Hilton.

McAffee, D. et al., Teleoperator Subsystem/Telerobot Demonstrator: Force Reflecting Hand Controller Equipment Manual, Jet Propulsion Laboratory, Jan. 1988.

McLaughlin, M. et al., The USC Interactive Art Museum: Removing the Barriers between Museums and their Constituencies, web site at http://ascusc.org/icmc/paperforica.html, as available via the Internet and printed Jul. 22, 2003.

Mine, M. et al., Virtual Environment Interaction Techniques, Department of Computer Science, University of North Carolina, Chapel Hill, NC, 1995.

Minsky, M., Computational Haptics: The Sandpaper System for Synthesizing Texture for a Force-Feedback Display, Submitted to the Program in Media Arts and Sciences, School of Architecture and Planning, in partial fulfillment of the requirements for the degree of Doctor of Philosophy at the Massachusetts Institute of Technology, Jun. 1995.

Noll, M., Man-Machine Tactile, SID Journal, Jul./Aug. 1972.

Ouh/Young, M. et al., Creating an Illusion of Feel: Control Issues in Force Display, Computer Science Department, University of North Carolina at Chapel Hill, Sep. 16, 1989.

Ouh/Young, M., Force Display in Molecular Docking, The University of North Carolina at Chapel Hill, 1990.

Ouh/Young, M. et al., The Development of a Low-Cost Force Feedback Joystick and its Use in the Virtual Environment. Proceedings of the Third pacific Conference on Computer Graphics and Applications, Pacific Graphics , Aug. 21/24, 1995.

Pao, L. et al., Synergistic Visual-Haptic Computer Interfaces, Hanoi, Vietnam, pp. 155-162, May 1998.

Patrick, N. et al., Design and Testing of a Non/Reactive, Fingertip, Tactile Display for Interaction with Remote Environments, Massachusetts Institute of Technology, Department of Mechanical Engineering.

Patrick, N., Design, Construction, and Testing of a Fingertip Tactile Display for Interaction with Virtual and Remote Environments, Submitted to the Department of Mechanical Engineering in partial fulfillment of the requirement for the degree of Masters of Science in Mechanical Engineering at the Mass. University of Technology, Aug. 1990.

Pimentel, K. et al., Virtual Reality through the New Looking Glass, Second Edition, 1995.

Rabinowitz, W. et al., Multidimensional Tactile Displays: Identification of Vibratory Intensity, Frequency, and Contractor Area, Journal of the Acoustical Society of America, vol. 82, No. 4, Oct. 1987.

Ramstein, C., Combining Haptic and Braille Technologies: Design Issues and Pilot Study, Second Annual ACM Conference on Assistive Technology, Apr. 11-12, 1996.

Rosenburg, L., Virtual Fixtures: Perceptual Overlays Enhance Operator Performance in Telepresence Tasks, A Dissertation submitted to the Department of Mechanical Engineering and the Committee on Graduate Studies of Stanford University in partial fulfillment of the requirements for the degree of Doctor of Philosophy, Jun. 1994.

Ruspini, D. et al., The Haptic Display of Complex Graphical Environments, Computer Graphics Proceedings, Annual Conference Series, 1997.

Russo, M., The Design and Implementation of a Three Degree of Freedom Force Output Joystick, Submitted to the Department of Mechanical Engineering in partial fulfillment of the requirement for the degree of Masters of Science in Mechanical Engineering at the Mass. University of Technology, May 1990.

Safe Flight Instrument Corporation, Coaxial Control Shaker, part No. C-25502, Jul. 1, 1967, revised Jan. 28, 2002.

Scannell, T., Taking a Joystick Ride, Computer Currents, Boston Edition, vol. 9, No. 11, Nov. 1994.

Schena, B., Patent Application Transmittal, Directional Inertial Tactile Feedback using Rotating Masses, Sep. 28, 2001.

Schmult, B. et al., Application Areas for a Force-Feedback Joystick, DSC-vol. 49, Advances in Robotics, Mechatronics, and Haptic Interfaces, ASME 1993.

Shimoga, K. , Finger Force and Touch Feedback Issues in Dexterous Telemanipulation, Proceedings from the Fourth Annual Conference on Intelligent Robotic Systems for Space Exploration, Rensselaer Plytechnic Institute, Troy, New York, Sep. 30/Oct. 1, 1992.

Snow, E. New Technology Transmittal, Model-X Force Reflecting Hand Controller, Jun. 15, 1989.

SMK, Multi-Functional Touch Panel, Force-Feedback Type, Developed, Sep. 30, 2002.

SMK, Force Feedback Type Optical Touch Panel Developed, Oct. 30, 2002.

Stanley, M. et al., Computer Simulation of Interacting Dynamic Mechanical Systems using Distributed Memory Parallel Processors, DSC/vol. 42, Advances in Robotics, ASME 1992.

Terry, J. et al., Tactile Feedback in a Computer Mouse, Proceedings of the Fourteenth Annual Northeast Bioengineering Conference, Mar. 10/11, 1988, University of New Hampshire.

Wiker, S., Teletouch Display Development: Phase 1 Report, Technical Report 1230, Jul. 1988.

European Patent Office, Partial European Search Report, European Application No. 14160148, dated Aug. 5, 2014.

European Patent Office, Communication Pursuan to Article 94(3) EPC, European Application No. 14160148, dated Nov. 11, 2015.

* cited by examiner

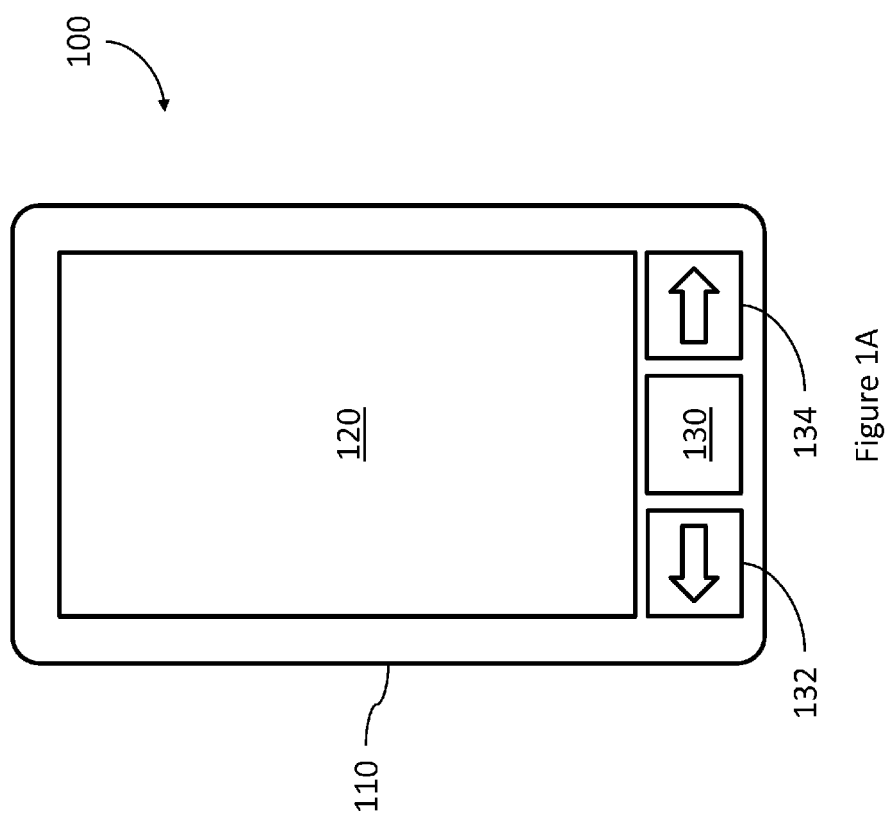

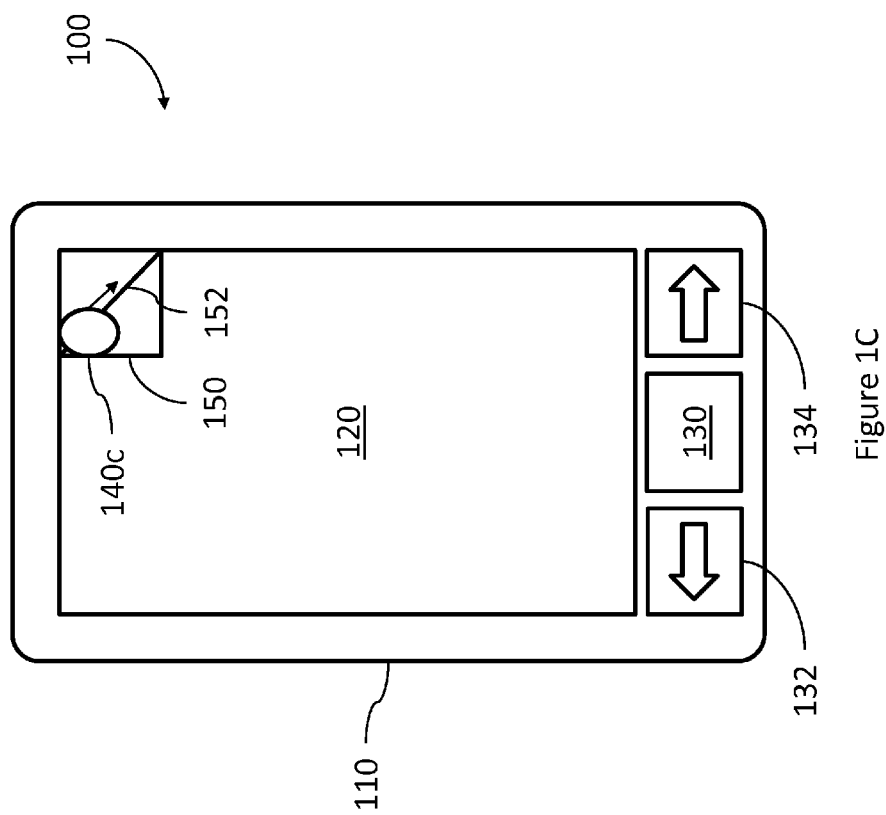

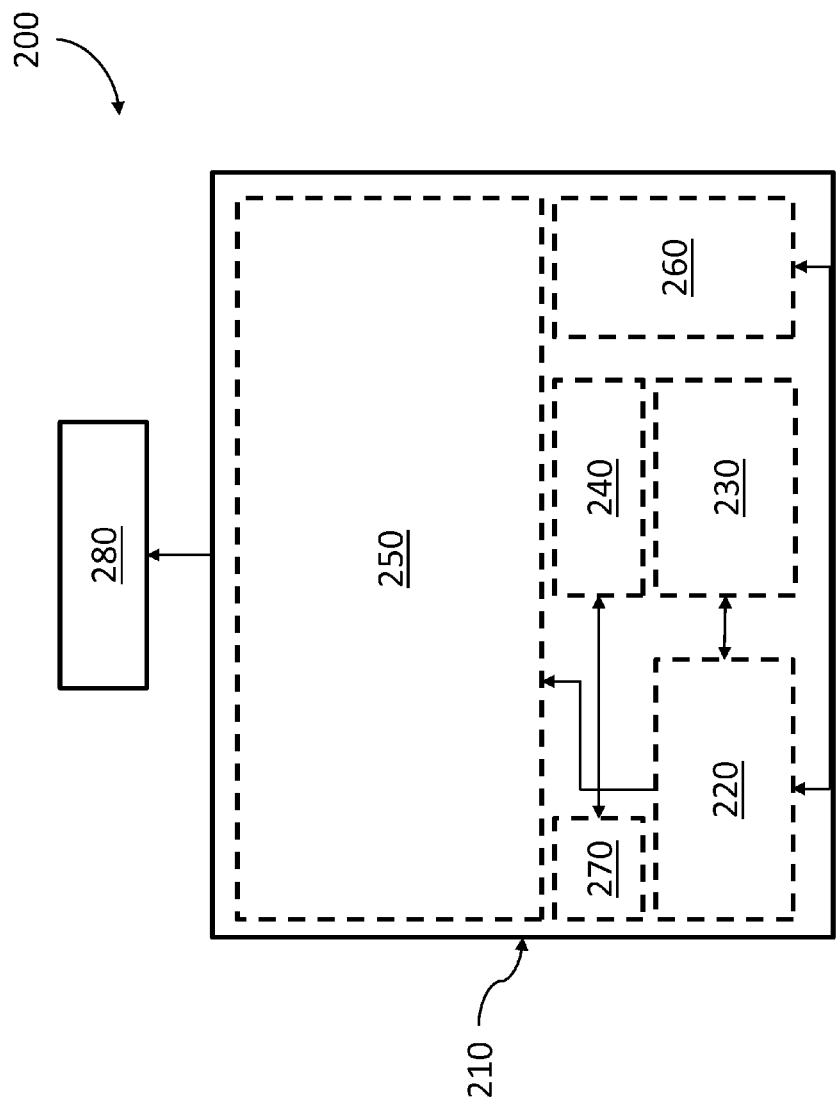

ns and methods for haptic and gesture-driven paper simulation.

SYSTEMS AND METHODS FOR HAPTIC AND GESTURE-DRIVEN PAPER SIMULATION

FIELD

The present disclosure generally relates to computer systems and more specifically relates to systems and methods for haptic and gesture-driven paper simulation.

BACKGROUND

The use of electronic documents and document readers has become more prevalent. With the advent of electronic books (e-books) and smart phones, dedicated e-book readers, tablets, and other portable devices, users have become accustomed to having large quantities of written material stored in electronic form for increased portability and ease of access. But while such e-book readers provide a user with the basic ability to view content on a display screen, the "pages" or documents shown on screen do not convey any sense of the paper the pages might have otherwise been printed on. E-books stored on a tablet or other portable device may provide a small, light form-factor, but fail to convey the experience of holding a book and feeling its pages, or of touching and moving a map to find a desired location.

SUMMARY

Embodiments according to the present disclosure provide systems and methods for haptic and gesture-driven paper simulation. For example, one disclosed embodiment comprises a method having the steps of receiving an electronic document, receiving metadata related to the electronic document, the metadata comprising a characteristic indicating a type of paper, generating and transmitting a display signal configured to cause display of the at least a portion of the document, and generating and transmitting a haptic signal based on the type of paper, the haptic signal configured to cause a haptic output device to generate a haptic effect. In another embodiment, a computer-readable medium comprises program code for causing a processor to carry out such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIGS. 1A-C show an illustrative system for haptic and gesture-driven paper simulation according to embodiments of the present disclosure;

FIG. 2 shows a system for haptic and gesture-driven paper simulation according to embodiments of the present disclosure;

DETAILED DESCRIPTION

Figure 1B:
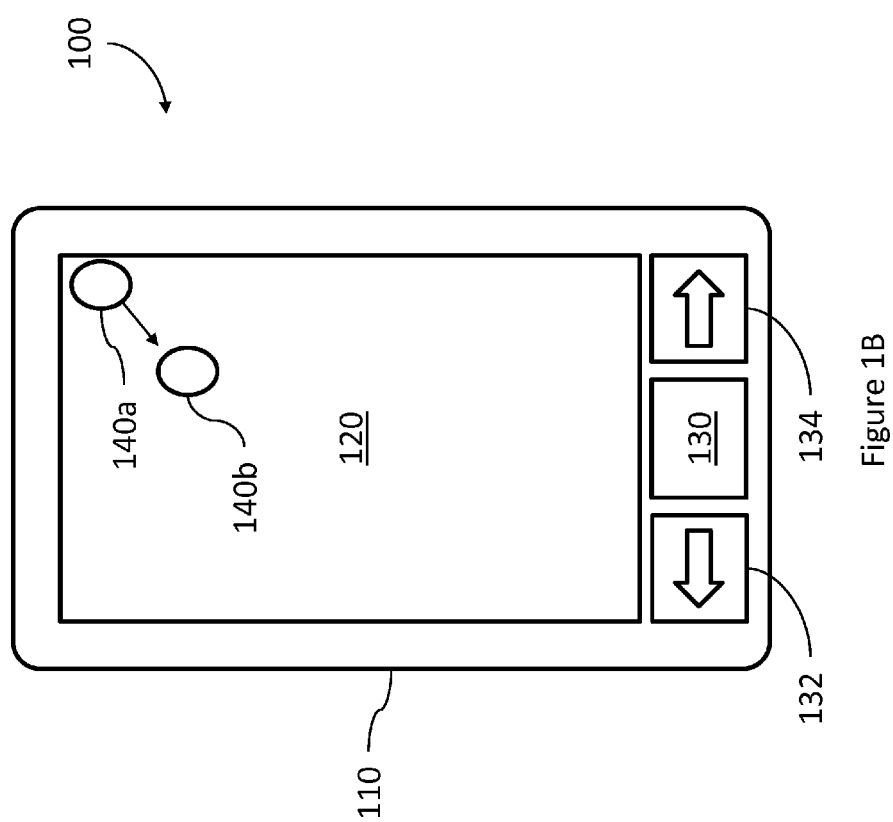

Example embodiments are described herein in the context of systems and methods for haptic and gesture-driven paper simulation. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative System for Haptic and Gesture-Driven Paper Simulation

Referring now to FIG. 1, FIG. 1 shows an illustrative system for haptic and gesture-driven paper simulation. In the embodiment shown in FIG. 1, the system includes a portable electronic book (e-book) reader 100 that has a touch-sensitive display screen 120 and buttons 130-34 in a housing 110 and a haptic output device that is capable of simulating textures when a user contacts the display. In addition, the reader includes another haptic output device that is capable of output vibrational effects to the touch-sensitive display. The reader 100 allows a user to download and read (and store) various e-books. For example, a user may purchase an e-book from a content provider, download the book from the content provider, and read the e-book using the screen 120. To navigate within the book, e.g. to turn a page, the user may use buttons 132 or 134 (which may be physical buttons or virtual buttons displayed on the touch screen), or the user may touch the display screen and perform a gesture, such as by swiping a finger from the right edge of the screen to the left edge of the screen to turn a page.

In this illustrative embodiment, the purchased e-book includes a variety of information, such the actual contents of the book—e.g. the words in the book—as well as metadata about the book. In this example, the book includes metadata that describes the type of paper on which the book is "printed," though in some cases, the user may be able to select a paper type or the device may supply the paper type based on simulated paper data available on the device. In this case, the metadata indicates that the book is a typical paperback book. The e-book reader 100 reads the metadata for the e-book and determines that the metadata provides tactile information about the pages of the book—in this case, the metadata indicates that the pages of the book are intended to simulate typical paper within a paperback book. After reading the metadata, the e-book reader 100 determines a texture associated with the tactile information and, upon detecting that a user is contacting the touch sensitive display 120, generates a texture haptic effect and outputs the effect to the display 120. Thus, as the user interacts with the pages of the book, such as by touching or moving a finger across the display, the user feels a texture that emulates the texture of actual paper, based on the metadata.

While reading the e-book, the user turns a page by swiping a finger from right to left on the display screen 100. As discussed above, the user feels the texture of the page as he turns the page. However, in addition to providing textural effects, the reader 100 also changes the displayed image of the page of the book as it turns. For example, if the user simply touches the right edge of the page and swipes his finger to the left, the reader 100 determines a basic page-turn gesture, and deforms the page to cause the page to slightly fold or "scrunch" up as a page in a physical book might if a user put a finger on the right edge of the page and pushed the edge of the page the left. In addition, the device 100 generates a vibrational effect to emulate the feel of the page rubbing against the next page in the book as the user slides his finger from right to left. Thus, in performing a simply page turn gesture, the user is provided with the sensation of interacting with a physical book: he can feel the texture of the paper, he can see the page deform as he performs the page turn, and he can feel the pages of the book rubbing against each other as they slide past each other. In some versions of this e-book reader 100, an audio effect may also be generated and output to emulate the sound of paper sliding on paper and the page turning.

As the user reads the next page of the book, he comes across a quotation that he particularly likes. The user then touches one finger 140a to the upper left corner of page as may be seen in FIG. 1B, his thumb 140b closer to the center of the page, and drags his finger 140a towards his thumb 140b while he holds his thumb 140b in place. The reader 100 determines that the user is only moving a part of the page, and responds by displaying the upper left corner of the page being folded towards the center of the book—i.e. the user is "dog-earring" the virtual page of the book. While the user is performing the gesture, the reader 100 outputs haptic effects to emulate the texture of the surface of the paper, as well as a vibration to emulate the page rubbing against itself. After the user has pinched his index finger to his thumb, and the reader displays the paper as being folded over 150, the user completes the "dog ear" 150 by running his finger 140c along the displayed "crease" created by the simulated folding of the page as shown in FIG. 1C. When the user touches the crease, and as he drags his finger 140c along the crease 152, the reader deforms the surface of the screen such that one portion of the contact area feels taller than another portion to simulate the creation of the crease in the page. Thus, the reader simulates the tactile sensation of the crease 152 in the page. In addition, after the user completes the "crease," the reader 100 generates and stores metadata with the e-book to save the "dog ear" such that the page will remain dog-earred, even after the user closes the book, and also to allow the user to easily return to the dog-earred page at a later time.

This illustrative example is given to introduce the reader to the general subject matter discussed herein and the disclosure is not limited to this example. The following sections describe various additional non-limiting embodiments and examples of systems and methods for haptic and gesture-driven paper simulation.

Referring now to FIG. 2, FIG. 2 shows a system for haptic and gesture-driven paper simulation according to one embodiment. In the embodiment shown in FIG. 2, the system 200 comprises a housing 210, a processor 220, a memory 230, a touch-sensitive display 250, a haptic output device 240, a communication interface 260, and a speaker 270. In addition, the system 200 is in communication with haptic output device 280, which may be optionally coupled to or incorporated into some embodiments. The processor 220 is in communication with the memory 230 and, in this embodiment, both the processor 220 and the memory 230 are disposed within the housing 210. The touch-sensitive display 250, which comprises or is in communication with a touch-sensitive surface, is partially disposed within the housing 210 such that at least a portion of the touch-sensitive display 250 is exposed to a user of the system 200. In some embodiments, the touch-sensitive display 250 may not be disposed within the housing 210. For example, the system 200 may be connected to or otherwise in communication with a touch-sensitive display 250 disposed within a separate housing. In some embodiment, the housing 210 may comprise two housings that may be slidably coupled to each other, pivotably coupled to each other or releasably coupled to each other.

In the embodiment shown in FIG. 2, the touch-sensitive display 250 is in communication with the processor 220 and is configured to provide signals to the processor 220 or the memory 230 and to receive signals from the processor 220 or memory 230. The memory 230 is configured to store program code or data, or both, for use by the processor 220, which is configured to execute program code stored in memory 230 and to transmit signals to and receive signals from the touch-sensitive display 250. In the embodiment shown in FIG. 2, the processor 220 is also in communication with the communication interface 260 and is configured to receive signals from the communication interface 260 and to output signals to the communication interface 260 to communicate with other components or devices such as one or more remote computers or servers. In addition, the processor 220 is in communication with haptic output device 240 and haptic output device 280, and is further configured to output signals to cause haptic output device 240 or haptic output device 280, or both, to output one or more haptic effects. Furthermore, the processor 220 is in communication with speaker 270 and is configured to output signals to cause speaker 270 to output sounds. In various embodiments, the system 200 may comprise or be in communication with fewer or additional components or devices. For example, other user input devices such as a mouse or a keyboard, or both, or an additional touch-sensitive device may be comprised within the system 200 or be in communication with the system 200. As another example, system 200 may comprise and/or be in communication with one or more accelerometers, gyroscopes, digital compasses, and/or other sensors. A detailed description of the components of the system 200 shown in FIG. 2 and components that may be in association with the system 200 are described herein.

The system 200 can be any device that is capable of receiving user input and displaying an electronic document. For example, the system 200 in FIG. 2 includes a touch-sensitive display 250 that comprises a touch-sensitive surface. In some embodiments, a touch-sensitive surface may be overlaid on the touch-sensitive display 250. In other embodiments, the system 200 may comprise or be in communication with a display and a separate touch-sensitive surface. In still other embodiments, the system 200 may comprise or be in communication with a display and may comprise or be in communication with other user input devices, such as a mouse, a keyboard, buttons, knobs, slider controls, switches, wheels, rollers, joysticks, other manipulanda, or a combination thereof.

In some embodiments, one or more touch-sensitive surfaces may be included on or disposed within one or more sides of the system 200. For example, in one embodiment, a touch-sensitive surface is disposed within or comprises a rear surface of the system 200. In another embodiment, a first touch-sensitive surface is disposed within or comprises a rear surface of the system 200 and a second touch-sensitive surface is disposed within or comprises a side surface of the system 200. In some embodiments, the system may comprise two or more housing components, such as in a clamshell arrangement or in a slidable arrangement. For example, one embodiment comprises a system having a clamshell configuration with a touch-sensitive display disposed in each of the portions of the clamshell. Furthermore, in embodiments where the system 200 comprises at least one touch-sensitive surface on one or more sides of the system 200 or in embodiments where the system 200 is in communication with an external touch-sensitive surface, the display 250 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the system 200 may comprise both flexible and rigid touch-sensitive surfaces.

In various embodiments, the system 200 may comprise or be in communication with fewer or additional components than the embodiment shown in FIG. 2. For example, in one embodiment, the system 200 does not comprise a speaker 270. In another embodiment, the system 200 does not comprise a touch-sensitive display 250, but comprises a touch-sensitive surface and is in communication with a display. In other embodiments, the system 200 may not comprise or be in communication with a haptic output device 240, 280 at all. Thus, in various embodiments, the system 200 may comprise or be in communication with any number of components, such as in the various embodiments disclosed herein as well as variations that would be apparent to one of skill in the art.

The housing 210 of the system 200 shown in FIG. 2 provides protection for at least some of the components system 200. For example, the housing 210 may be a plastic casing that protects the processor 220 and memory 230 from foreign articles such as rain. In some embodiments, the housing 210 protects the components in the housing 210 from damage if the system 200 is dropped by a user. The housing 210 can be made of any suitable material including but not limited to plastics, rubbers, or metals. Various embodiments may comprise different types of housings or a plurality of housings. For example, in some embodiments, the system 200 may be a portable device, handheld device, toy, gaming console, handheld video game system, gamepad, game controller, desktop computer, e-book reader, portable multifunction device such as a cell phone, smartphone, personal digital assistant (PDA), laptop, tablet computer, digital music player, etc. In other embodiments, the system 200 may be embedded in another device such as a wrist watch, other jewelry, gloves, etc. Thus, in embodiments, the system 200 is wearable.

In the embodiment shown in FIG. 2, the touch-sensitive display 250 provides a mechanism to allow a user to interact with the system 200. For example, the touch-sensitive display 250 detects the location or pressure, or both, of a user's finger in response to a user hovering over, touching, or pressing the touch-sensitive display 250 (all of which may be referred to as a contact in this disclosure). In one embodiment, a contact can occur through the use of a camera. For example, a camera may be used to track a viewer's eye movements as the user views the content displayed on the display 250 of the system 200, or the user's eye movements may be used to transmit commands to the device, such as to turn a page or to highlight a portion of text. In this embodiment, haptic effects may be triggered based at least in part on the viewer's eye movements. For example, a haptic effect may be output when a determination is made that the viewer is viewing content at a particular location of the display 250. In some embodiments, the touch-sensitive display 250 may comprise, be connected with, or otherwise be in communication with one or more sensors that determine the location, pressure, a size of a contact patch, or any of these, of one or more contacts on the touch-sensitive display 250. In some embodiments, the touch-sensitive display 250 may comprise a multi-touch touch-sensitive display that is capable of sensing and providing information relating to a plurality of simultaneous contacts. For example, in one embodiment, the touch-sensitive display 250 comprises or is in communication with a mutual capacitance system. Some embodiments may have the ability to sense pressure or pseudo-pressure and may provide information to the processor associated with a sensed pressure or pseudo-pressure at one or more contact locations. In another embodiment, the touch-sensitive display 250 comprises or is in communication with an absolute capacitance system. In some embodiments, the touch-sensitive display 250 may comprise or be in communication with a resistive panel, a capacitive panel, infrared LEDs, photodetectors, image sensors, optical cameras, or a combination thereof. Thus, the touch-sensitive display 250 may incorporate any suitable technology to determine a contact on a touch-sensitive surface such as, for example, resistive, capacitive, infrared, optical, thermal, dispersive signal, or acoustic pulse technologies, or a combination thereof.

In the embodiment shown in FIG. 2, haptic output devices 240 and 280 are in communication with the processor 220 and are configured to provide one or more haptic effects. For example, in one embodiment, when an actuation signal is provided to haptic output device 240, haptic output device 280, or both, by the processor 220, the respective haptic output device(s) 240, 280 outputs a haptic effect based on the actuation signal. For example, in the embodiment shown, the processor 220 is configured to transmit a haptic output signal to haptic output device 240 comprising an analog drive signal. In some embodiments, the processor 220 is configured to transmit a high-level command to haptic output device 280, wherein the command includes a command identifier and zero or more parameters to be used to generate an appropriate drive signal to cause the haptic output device 280 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 240 or 280, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments comprising haptic output devices 240, 280 that are capable of generating frictional or deformations, the haptic output devices 240 or 280 may be overlaid on the touch-sensitive display or otherwise coupled to the touch-sensitive display 250 such that the frictional or deformation effects may be applied to a touch-sensitive surface that is configured to be touched by a user. In some embodiments, other portions of the system may provide such forces, such as portions of the housing that may be contacted by the user or in a separate touch-separate input device coupled to the system. Co-pending U.S. patent application Ser. No. 13/092,484, filed Apr. 22, 2011, entitled "Systems and Methods for Providing Haptic Effects," the entirety of which is hereby incorporated by reference, describes ways that one or more haptic effects can be produced and describes various haptic output devices.

It will be recognized that any type of input synthesis method may be used to generate the interaction parameter from one or more haptic effect signals including, but not limited to, the method of synthesis examples listed in TABLE 1 below.

TABLE 1

METHODS OF SYNTHESIS

| Synthesis Method | Description |
| --- | --- |
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

In FIG. 2, the communication interface 260 is in communication with the processor 220 and provides wired or wireless communications from the system 200 to other components or other devices. For example, the communication interface 260 may provide wireless communications between the system 200 and a communications network. In some embodiments, the communication interface 260 may provide communications to one or more other devices, such as another system 200 and/or one or more other devices. The communication interface 260 can be any component or collection of components that enables the system 200 to communicate with another component, device, or network. For example, the communication interface 260 may comprise a PCI communication adapter, a USB network adapter, or an Ethernet adapter. The communication interface 260 may communicate using wireless Ethernet, including 802.11 a, g, b, or n standards. In one embodiment, the communication interface 260 can communicate using Radio Frequency (RF), Bluetooth, CDMA, TDMA, FDMA, GSM, Wi-Fi, satellite, or other cellular or wireless technology. In other embodiments, the communication interface 260 may communicate through a wired connection and may be in communication with one or more networks, such as Ethernet, token ring, USB, FireWire 1394, fiber optic, etc. In some embodiments, system 200 comprises a single communication interface 260. In other embodiments, system 200 comprises two, three, four, or more communication interfaces.

Examples of Haptic and Gesture-Drive Paper Simulation

While electronic books and other types of electronic documents have become more prevalent, a user of such technology is detached from the physical sensations associated with interacting with more traditional printed media, such as physical books, bound pages, maps, stacks of paper, etc. And while there are advantages to electronically stored documents, many users of such electronic documents enjoy the feel of reading a book, reading a newspaper, opening and folding a road map or atlas, flipping through pages in a document, and otherwise interacting with a physical object. Embodiments according to this disclosure provide visual, audio, tactile, and other feedback to users of electronic documents to enable the user to more fully interact with the electronic documents and to provide an experience that more closely resembles interactions with physical media.

Throughout this disclosure, the term "electronic document" is used as a broad term to generally refer to electronically stored data, such as in computer memory or one or more computer files or databases, or other information that can be interpreted by a computing device and may be amenable to display on a display screen, or other devices capable of outputting effects that may be interpreted through the senses, including touch, taste, smell, sight, and hearing. It is not intended to be limited to traditional types of documents, e.g. books or magazines, whose content may be represented electronically, but rather, any electronic representation of data that may be presented to a user in some fashion is encompassed by the term and the term "electronic document" should not be limited to any narrow definition. Examples of some electronic documents suitable for use with the present disclosure include electronic books, word processing documents, portable document format (PDF) documents, graphical files, video files, video games, emails, text messages and short message service (SMS) messages, multimedia messaging service (MMS) messages, web pages, forms, animations, and many other suitable types of electronically stored or presented data. Many of the following examples related to interactions with electronic documents that simulate traditional physical media, such as paper; however, as discussed above, electronic documents are not so limited.

Embodiments according to this disclosure may provide representations of electronic documents to allow reproduction of the electronic document through multiple different stimuli. For example, electronic documents, in addition to being represented by the substantive content (e.g. pictures and text), may also include metadata to indicate physical or simulated physical properties of individual components of the document (e.g. pages, covers, tabs, dividers, etc.). For example, an electronic document may be represented using a standard generalized markup language (SGML)-based document, e.g. extensible markup language or XML, that includes substantive content as well as metadata fields for storing parameters describing characteristics of the electronic document. In one embodiment, an electronic document may be represented, at least in part, by an XML document comprising fields for visual, tactile, audio, or other properties of the document. Tactile properties may comprise a coefficient of friction, an indication of roughness or smoothness, and indication of variability of surface features (e.g. paper may have significant variations in texture due to a manufacturing process or wear and tear), a pliability or compliance value or values, a resilience indication (e.g. a resistance to permanent deformation, such as through folding or tearing), an absorbency parameter, or other parameters that may represent physical qualities of the component of the document.

In addition to tactile parameters, other parameters describing physical characteristics of the components of the electronic document may be provided. For example, visual characteristics may be identified, such as color of the component, markings on the component, textures to be displayed on the component, reflectiveness, color change parameters due to simulated liquid spills, age, or other parameters that may affect the visual appearance of one or more components of the document. Olfactory information may be provided as well, such as dustiness, mustiness, ink smells, etc. Audio information may be provided, such as one or more sound recordings of components of the document sliding against each other (e.g. recordings of pages rubbing), a cover being opened, a cover being closed, pages being turned, pages being flipped through, pages being folded or torn, etc. Further, multiple audio recordings may be provided for any property, which may provide slight variations in audio response and thus a more realistic experience for a user. In some embodiments, audio parameters may be provided for generating audible responses. For example, basic audio waveforms may be provided that may be distorted or changed based on parameters such as roughness, speed of motion, etc.

While metadata may be provided with an electronic document, or may be later associated with an electronic document, some embodiments allow a user to alter or create metadata associated with an electronic document. For example, a user may interact with an electronic document by folding or tearing the document. Such actions may generate metadata that may be associated with the electronic document and stored such that later viewings of the document retain the manipulations performed by the user. In some scenarios, such as in a game, a user may spill liquid on an electronic document and alter its appearance or weight, temporarily or permanently, which may be stored as metadata associated with the electronic document. In an embodiment where a user reads an e-book, the user may mark pages by folding or tearing them and thereby cause metadata to be created and associated with the document. Thus, embodiments according to the present disclosure may provide simulated paper as well as a simulation of the use and aging of an electronic document over time. As physical objects may accumulate signs of wear and tear, embodiments according to this disclosure, may provide mechanisms for providing virtual "wear and tear" on an electronic document. Further, such accumulated metadata may be transferred with an electronic document, such as if a user shares an electronic document with another person, or the accumulated metadata may be partially or completely removed to restore an electronic document to its "original" condition.

In some embodiments, metadata may be provided with an electronic document, while in some embodiments, metadata may be stored by a system according to embodiments for application to electronic documents. For example, in one embodiment, an e-book reader may have a library of metadata information relating to different types of books, such as paperback books, hardcover books, text books, newspapers, magazines, etc. Thus, when receiving a new electronic book, if the new e-book does not have its own metadata (or, in some embodiments, even if it does), the reader's own library of metadata may be applied to the e-book to provide various sensations to a user when the user interacts with the e-book. In some embodiments, the library of metadata may be stored remotely from the reader and may be accessed if needed or desired, such as from a remote server connected to the Internet. In some embodiments, an electronic document may comprise metadata indicating the location of remotely-stored metadata associated with the electronic document. Each of these variations is generally applicable to any and all embodiments according to this disclosure; they are not limited to the above example of an e-book reader, but rather may be used in any suitable embodiment and in any combination.

Figure 3:
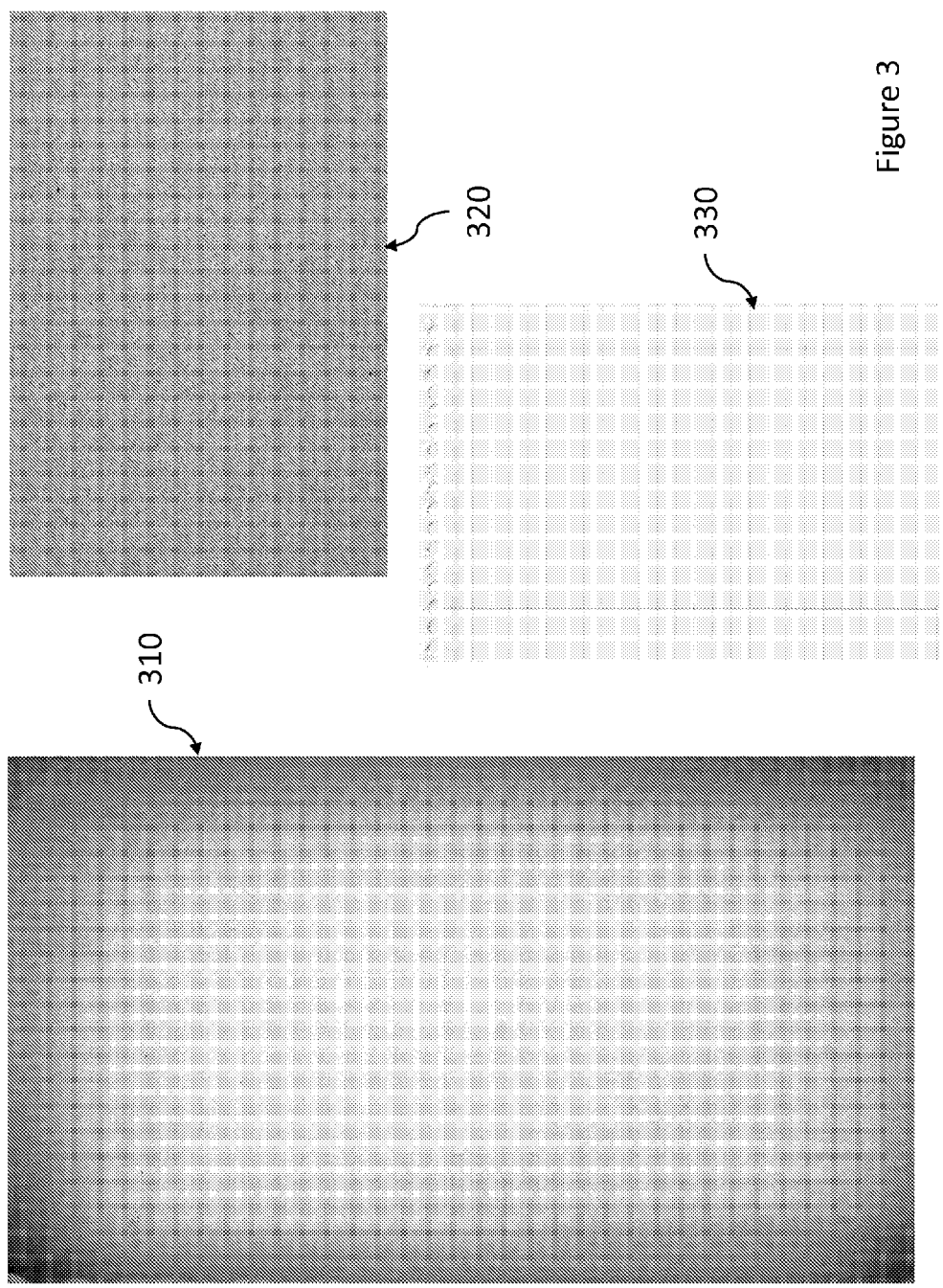
FIG. 3 shows embodiments of simulated paper according to one embodiment of the present disclosure.

Referring now to FIG. 3, FIG. 3 shows examples of physical media that may be simulated according to various embodiments. Each of the embodiments shown in FIG. 3 is a representation of a sheet of paper. For example, sheet 310 is an example of a sheet of aged paper. As is known, old paper may tend to be dry and brittle and may develop cracks or may break apart when touched. Though in some cases, old sheets of paper may be made from different types of material, such as animal skins (e.g. vellum), wood pulp, papyrus, cotton, etc. Each of these different types of paper may have different physical properties when aged, such as a darkened appearance, increased brittleness, fading of text, etc. In addition, as paper ages, it may accumulate markings or defects, such as stains or tears. Thus, some embodiments may provide metadata that changes or can change over time, such as by increasing or decreasing in value after each use, or accruing additional parametric information. Sheet 320 represents card stock, which is understood to be a thicker, heavier paper that is more difficult to bend or fold. Different types of card stock may have different textures depending on their thickness, material properties, any surface features (e.g. folds or defects), etc. Further, it may be more difficult to manipulate card stock, such as turning pages of a document made from card stock, or folding an invitation on card stock. Each of these parameters, as well as others, may be represented by metadata describing the sheet 320. Sheet 330 is a piece of thin notebook paper that provides a relatively familiar set of physical properties, such as being easily manipulated (e.g. folded, torn, turning to a new page, marking, etc.), relatively smooth and featureless, and providing generally well-known responses when sliding across other sheets of paper, being torn from a notebook, or when a user thumbs through a stack of paper. Each of the sheets of paper shown in FIG. 3 may be represented by metadata according to one or more embodiments and, as discussed above, may accumulate additional metadata over time.

Figure 4B:
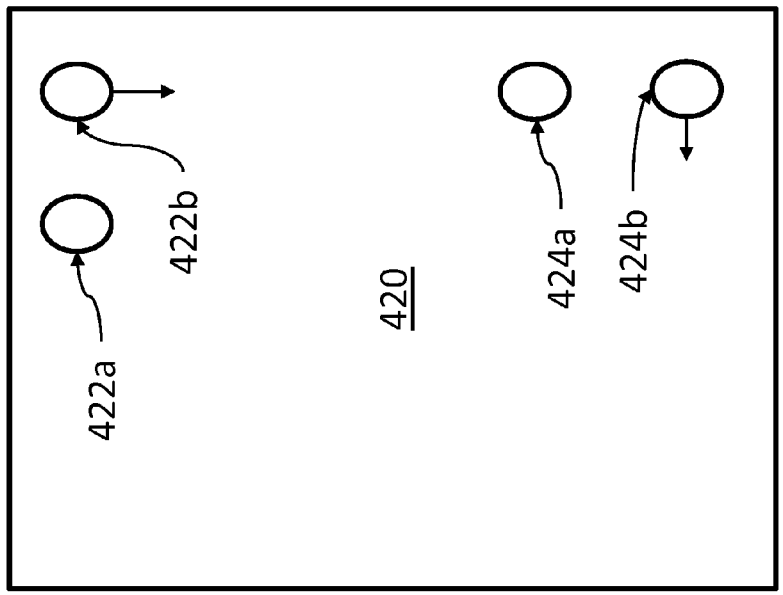
FIGS. 4A-B and 5A-C show gestures for interacting with simulated paper according to embodiments of the present disclosure.
Figure 4A:
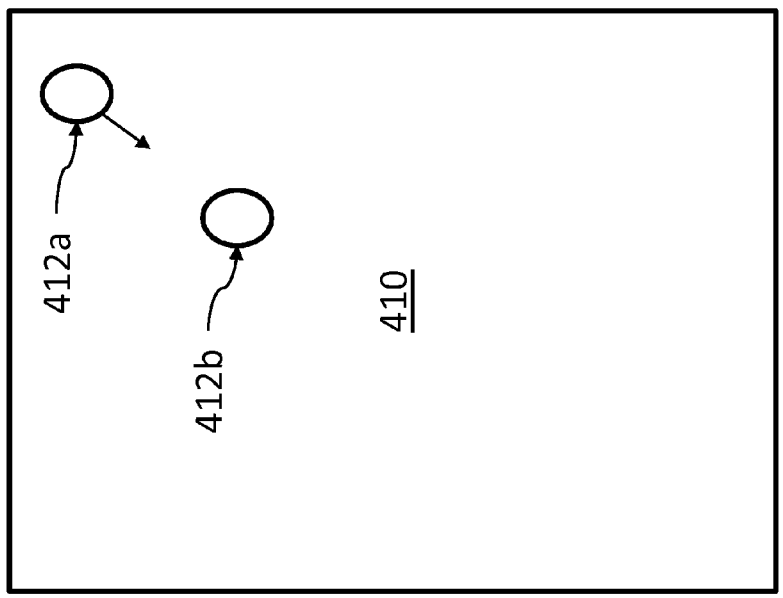

Referring now to FIGS. 4 and 5, FIGS. 4 and 5 show examples of gestures that may be employed when interacting with an electronic document. For example, a dog-earring gesture is shown in FIG. 4A with respect to electronic document 410 and resembles the embodiment discussed above with respect to FIGS. 1A-C. The embodiment shown in FIG. 4B shows examples of gestures that may result in tears in an electronic document. For example, a user touches a first finger 422*a* to one part of a document and a second finger 422*b* adjacent to the first finger 422*a* and, while holding the first finger 422*a* stationary, the user drags his second finger 422*b* in a shearing motion down and away from the first finger 422*a*. As is understood, such a manipulation of a sheet of paper would result in deformation of the sheet of paper, such as a tearing of a paper. While in both examples discussed above one contact point is stationary and another is in motion, a device according to embodiments disclosed herein may analyze the relative motion of the contact points to determine a resulting effect on an electronic document. For example, if two contact points draw close to each other, the device may interpret a folding effect, while if two contact points move apart, the device may interpret a stretching or tearing effect.

Figure 5B:
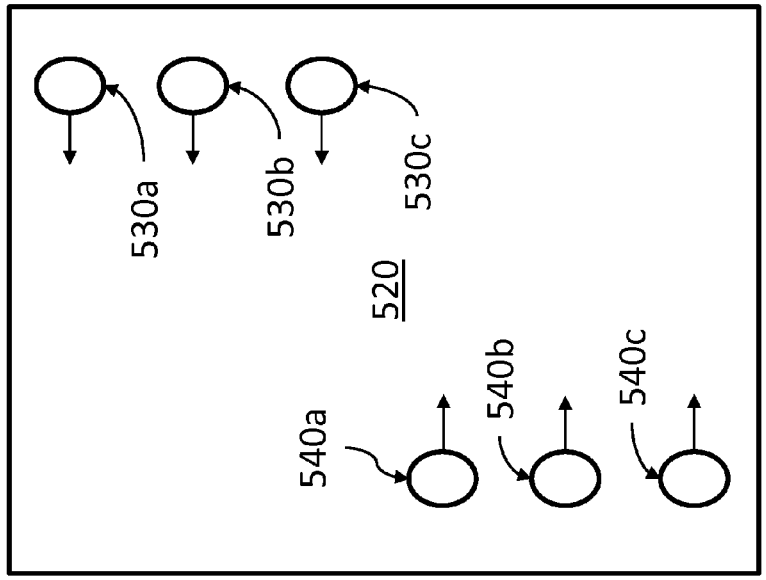
Figure 5A:
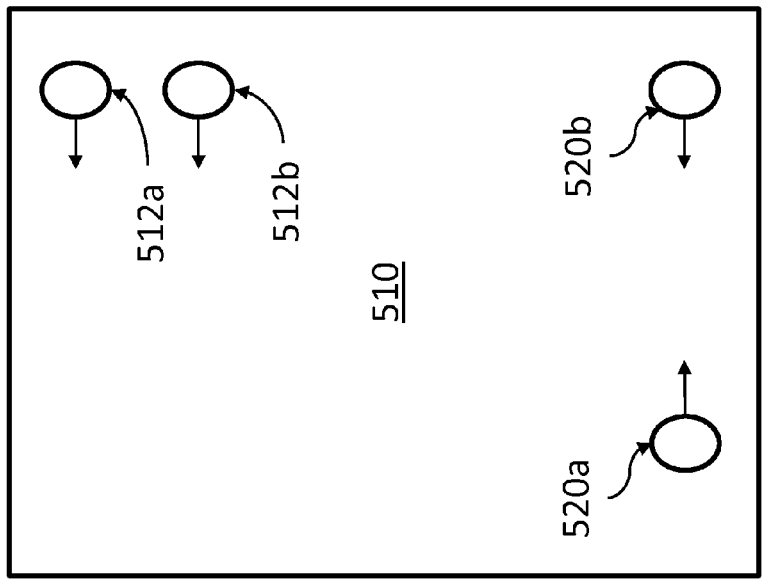
Figure 5C:
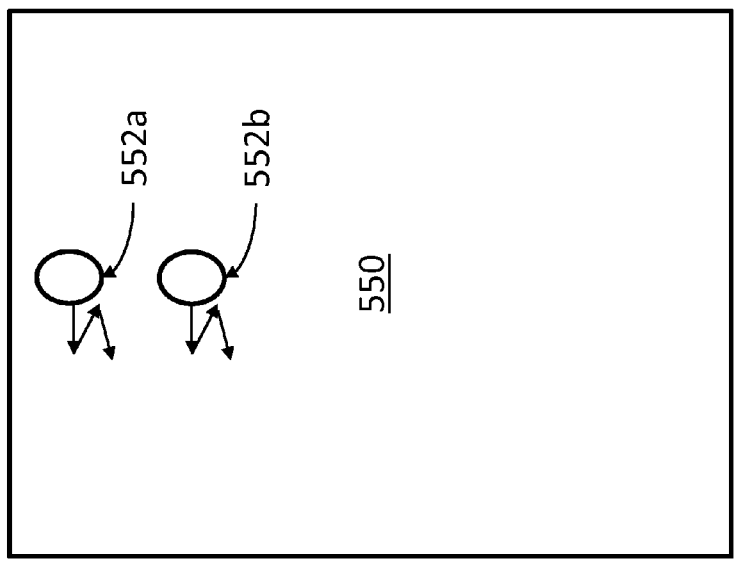

A similar gesture is shown with respect to contact points 424*a* and 424*b*, where a user is making a gesture that may be interpreted as creating a horizontal tear in the electronic document. In FIG. 5A, two different gestures are shown. The first gesture, comprising contact points 512*a* and 512*b*, indicates two contact points on an electronic document and a substantially simultaneous left-ward travel of each contact point, which may be interpreted as a page turn, or a multi-page turn. The movements of contact points 520*a* and 520*b* towards each other may be interpreted as a folding gesture. In FIG. 5B, the three contact points, 530*a-c*, and the substantially simultaneous left-ward travel may be interpreted as a searching gesture or a "thumbing-through" gesture. Such a gesture may cause multiple pages to turn in rapid succession towards the end of the document until a page with one or more user-applied features is located, e.g. a page with a dog-ear or a tear. In some embodiments, another way of creating a 'thumbing through' gesture would be to place the thumb on a simulated stack of paper, signifying additional pages in the book. An auxiliary gesture such as a device tilt gesture or, in the case of bendable/flexible displays, a device bend gesture, can then be used to trigger a "skimming" interaction, flipping the pages of the ebook in quick succession. If a page that has been previously 'dog-earred' is in the stack, it may result in a different haptic sensation at the moment it comes to the top of the stack, the speed of the pagination may be temporarily slowed, or other indication made. Alternatively, the three contact points, 540*a-c*, may be interpreted as the same gesture as with respect to contact points 530*a-c*, but towards the beginning of the electronic document, rather than towards the end of the document. In the embodiment shown in FIG. 5C, a user may rapidly swipe two fingers 552*a-b* back and forth in a "scrubbing" motion. The device may recognize these movements as a "scrub" gesture, which in one embodiment results in pages turning in rapid succession, and may provide haptic cues as pages with user-created metadata (e.g. folds, tears, highlights) are passed. In some embodiments, the system may pause briefly as pages with such metadata are encountered. Such a gesture may allow a user to rapidly "thumb through" a book or document to search for previous notes or annotations, or to skim its contents.

It should be noted that in the examples discussed above, the gestures may be pre-defined gestures that are recognized by a system according to an embodiment of this disclosure, or may simply be inputs into a routine that determines deformations to a page or document based on received inputs. For example, the "dog-ear" gesture may be recognized by a system according to one embodiment as having a pre-defined effect on a page of a document—e.g. a dog-earring of a corner of a page—and may trigger a pre-defined response to the gesture. In some embodiments, though, the system may simply determine that a portion of a document is being moved, while another portion is held stationary, and may then determine a response to the inputs based on properties of the electronic document, such as thickness of the medium, resilience, brittleness, etc. and provide a visual, tactile, auditory, or other response based on such a determined response. Thus, the present disclosure is not confined solely to pre-defined gestures and responses, but also encompasses calculated responses of an electronic document to received interactions.

Figure 6:
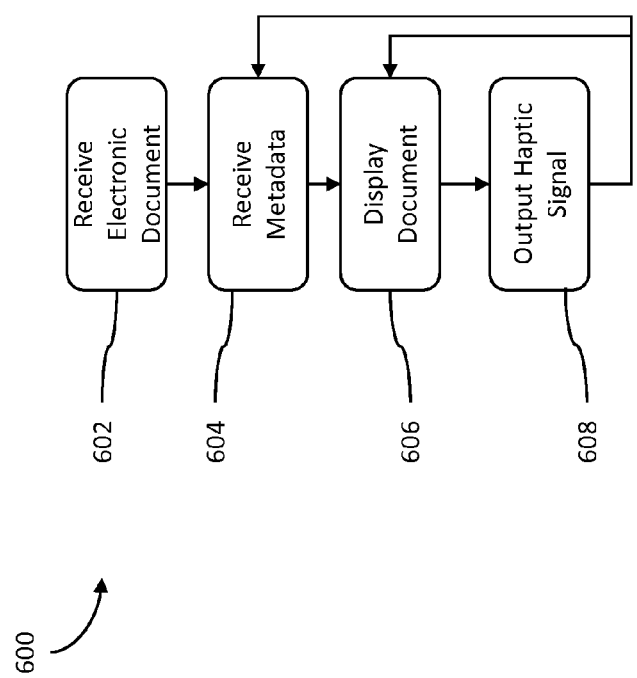
FIGS. 6 and 7 show methods for haptic and gesture-driven paper simulation according to embodiments of the present disclosure.

Referring now to FIG. 6, FIG. 6 shows a method for haptic and gesture-driven paper simulation according to one embodiment. FIG. 6 is described with respect to a software application executed by the system shown in FIG. 2; however, the methods disclosed herein are not limited to execution by only the system shown in FIG. 2, but rather may be executed by any suitable electronic system.

The method shown in FIG. 6 begins in block 602 by receiving an electronic document. An electronic document may be received in a wide variety of ways. For example, an electronic document may be received from a remote device, such as a remote server, over a network, such as by employing the communications interface 260 to connect to and communicate over the network with the remote device. In one embodiment, the electronic document may be stored on a computer readable medium within a device, such as memory 230. In some embodiments, the computer-readable medium may comprise a non-volatile medium, such as flash memory, though in some embodiments, the computer readable medium may comprise a volatile medium, such as random access memory (RAM). For example, in one embodiment, the system 200 may be configured to receive a memory module, such as a flash drive or memory chip, that has one or more electronic documents stored on it.

In some embodiments, the system 200 may receive the electronic document, such as by receiving a connection to a device comprising the electronic document. In some embodiments, a software application executed by the system 200 may receive the electronic document. For example, in one embodiment, the system 200 may execute a software application for reading and interpreting an electronic document. The software application may be provided with a location of an electronic document to be retrieved and read. In one embodiment, a location may comprise a uniform resource locator (URL), such as a World Wide Web (WWW) address, or an address of a device that can provide an electronic document, such as a cloud storage location. In one embodiment, a location may comprise a location within a file system stored within, or accessible by, the system 200. In one embodiment, a location may comprise a pointer or a reference to a location in RAM where an electronic document may be accessed. The software application may receive an electronic document from any of these locations or from other sources that may provide an electronic document. After an electronic document has been received, the method proceeds to block 604.

In block 604, metadata associated with the electronic document is received. As discussed above, metadata may be associated with electronic documents and may include a wide variety of information. For example, metadata may include information about a type of paper or types of paper associated with the electronic document, or may comprise haptic information, visual information, audio information, or other information or references to pre-defined haptic, visual, audio effects, or other types of effects or information associated with the electronic document. In some embodiments, an electronic document may be stored within a single file that may also comprise the electronic document's metadata. In some embodiments, metadata may be stored in a separate file or in multiple separate files. For example, in one embodiment, metadata regarding haptic effects is stored in a first file, metadata regarding visual effects is stored in a second file, metadata regarding types of paper is stored in a third file, while metadata regarding types of audio effects are stored in a fourth file. The different files are then associated with the electronic document. For example, the different files may be referenced by the electronic document, such as by information within the electronic document, or the files may have filenames related to a filename of the electronic document. In some embodiments, other arrangements of metadata may be used, such as being dynamically provided from a remote location or generated on the fly based on user interactions with the electronic document, such as by folding, tearing, marking, or otherwise interacting with the electronic document. In some embodiments, dynamic metadata may be dynamically provided based on one or more user configuration settings. For example, in one embodiment, haptic information may be generated on the fly, such as to provide braille effects on a deformable display, based on a configuration setting indicating that a user has diminished sight. In one embodiment, metadata identifying describing audio information may be generated, such as synthesized voice to read words aloud from an electronic document, based on a configuration setting.

In one embodiment a software application for reading an electronic document may be configured to receive and access metadata related to an electronic document from the contents of the electronic document. For example, the software application may read and interpret and electronic file comprising the electronic document. As a part of this process, the software application may read and interpret data identified as metadata and then interpret the metadata. In one embodiment, an electronic document may comprise an XML document. While reading and interpreting the XML document, the software application may encounter a metadata tag indicating a haptic effect, such as a tag <meta haptic-effect="sandpaper">. The software application may interpret the tag as indicating that a "sandpaper" haptic effect, such as a frictional effect, is indicated. Other embodiments may receive metadata from other sources.

For example, in some embodiments, a software application may receive metadata associated with an electronic book from one or more metadata files. For example, as is known in the art, web-based documents may comprise HTML or XML documents and associated style sheet documents, such as one or more CSS (cascading style sheet) files. Embodiments according to the present disclosure may employ one or more CSS files, or other CSS-like files, to provide metadata associated with one or more electronic documents. Still further embodiments may employ other file types to provide metadata associated with one or more electronic documents.

Some embodiments may receive metadata from other computers or storage devices, such as in response to a request for metadata or in conjunction with providing an electronic document. For example, in one embodiment, metadata is stored in a database that may be accessed by a software application for using or providing an electronic document. In such an embodiment, the electronic document, or one or more files associated with the electronic document, may provide one or more references to the database as providing associated metadata. In some embodiments, the software application may access the database to augment an electronic document in with metadata cases where the electronic document does not have its own metadata or does not have metadata associated with it, or may apply such metadata in addition to, or to replace, metadata associated with the electronic document. Thus, in some embodiments, the software application may apply preexisting metadata, or may generate metadata on the fly, while reading and interpreting an electronic document. In some embodiments, the software application may access metadata stored remotely from the software application, such as in a cloud storage location or from a service provider or library of metadata that may be associated with an electronic document. For example, in one embodiment, a software application according to this disclosure may request and receive metadata from a remote server or servers, such as from the provider of the electronic document, or from a party unrelated to the electronic document.

Thus, the present disclosure contemplates receiving metadata from a wide variety of sources, including the electronic document itself, one or more files associated with the electronic document, databases, cloud storage, and other local or remote locations. After the software application has received metadata associated with the electronic document, the method proceeds to block 606.

In block 606, the software application displays the electronic document. In one embodiment, the software application displays the electronic document. For example, in one embodiment, the software application generates and transmits signals to the display 250 to display an image of part or all of the electronic document. In addition, software application may generate one or more signals to display a haptic effect, an audio effect, or other effect. It should be noted that the term "display" according to this disclosure includes the presentation of information, which may include optical, tactile, audible, or other types of information. Thus, in some embodiments, an electronic document may be displayed for viewing and feeling. Further, in some embodiments, the displayed information may change over time, such as based on user interactions or metadata that specifies changing display effects. For example, a user may turn the page of an e-book, which may cause a display of new information associated with the electronic document.

After the electronic document is displayed, the method proceeds to block 608.

In block 608, the software application outputs a haptic signal. For example, in one embodiment, the software application generates and outputs a haptic signal to haptic output device 240. To generate the haptic signal, the software application interpret metadata associated with the electronic that describes parameters associated with a haptic effect to be output. For example, if the haptic effect is a vibration, the parameters may comprise frequency and magnitude for the vibration, and in some embodiments, may also include parameters of a modulating or envelope signal to modulate the haptic effect. In some embodiments, parameters may comprise a coefficient of friction, a size, shape, and location of a frictional effect, a size, shape, and location of a deformation for a surface, a duration of a haptic effect, or an intensity of a haptic effect. Still further parameters may be provided. In some embodiments, haptic effects may be generated by identifying references to pre-defined haptic effects. For example, metadata associated with an electronic document may reference a "sandpaper" effect. A "sandpaper" haptic effect may then be located within a database, and parameters associated with the "sandpaper" haptic effect may be received and used to generate and output the haptic effect.

In some embodiments, haptic effects may be generated dynamically. For example, in some embodiments, haptic effects may only be generated and output as a user interacts with an electronic document. For example, if a user slides a finger across a display screen, a haptic effect may be generated only at the location, or also at the next anticipated location(s) for the contact rather than across the entire touch-sensitive surface. Such an embodiment may advantageously reduce power consumption by a haptic output device. For example, the software application may detect a direction and velocity of a contact and cue haptic effects for the next locations anticipated to be encountered by the user's finger, while haptic effects applied to locations no longer contacted by the user may be discontinued.

After a haptic effect has been output, the method may return to blocks 604 or 606 to receive additional metadata or to display the same or different portions of the electronic document. The method may then repeat to provide an interactive experience with the electronic document, or the method may return to block 602 if an additional or new electronic document is received.

Figure 7:
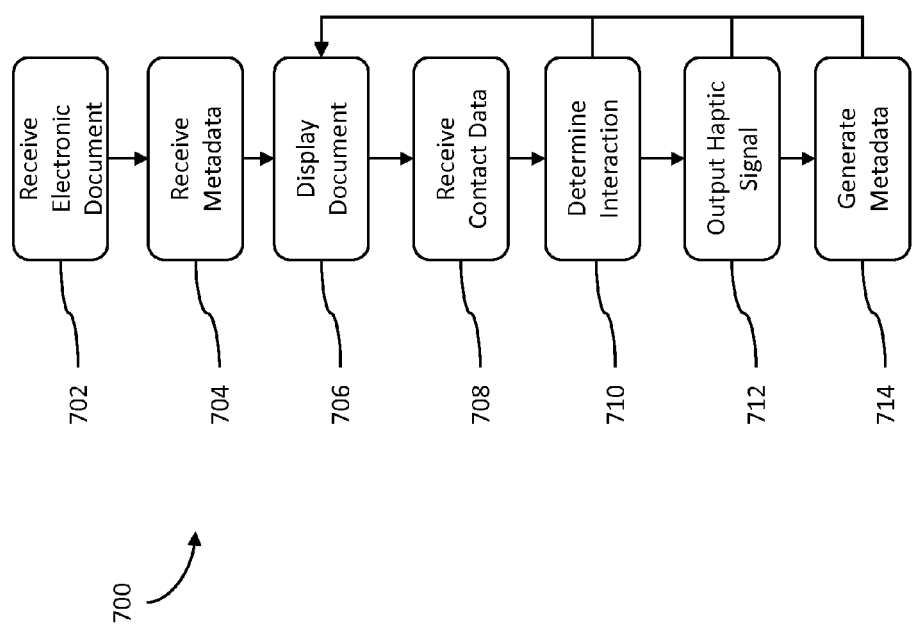

Referring now to FIG. 7, FIG. 7 shows a method for haptic and gesture-driven paper simulation according to one embodiment. FIG. 7 is described with respect to a software application executed by the system shown in FIG. 2; however, the methods disclosed herein are not limited to execution by only the system shown in FIG. 2, but rather may be executed by any suitable electronic system.

The method shown in FIG. 7 begins in block 702 by receiving an electronic document. Blocks 702-706 recite functions disclosed above with respect to blocks 602-606 of FIG. 6 and detailed disclosure relating to these function are provided above with respect to FIG. 6.

In block 708, the software application receives contact data related to contact with a touch-sensitive input device, such as touch-sensitive display 250. To receive contact data, the software application may receive information based on a sensed interaction with the touch-sensitive input device. For example, a user may touch the touch-sensitive input device to interact with the displayed electronic document. Contact data may comprise location information, such as an x,y coordinate or coordinates, size of a contact area (or areas), pressure or pseudo-pressure information, movement information, gesture information, and other information that may be provided by a suitable touch-sensitive input device.

After receiving contact data from the touch-sensitive input device, the software application may determine one or more gestures based on the contact data. In some embodiments, the touch-sensitive input data may provide updated contact data periodically or asynchronously as contact data changes based on the sensed interaction. The software application may determine the gestures based on contact data received over time, such as to sense movement of a contact point (or contact points). For example, the touch-sensitive input device may determine gestures including, presses, drags, tears, folds, swipes, scrolls, scrubs, and others, based on the received contact data. After receiving the contact data and, in some embodiments, determining a gesture associated with the contact data, the method proceeds to block 710.

In block 710, the software application determines an interaction with the document based on the contact data. For example, in some embodiments, the software application may determine a contact on the touch-sensitive display 250 at a location corresponding to a portion of the electronic document. In one such embodiment, the software application may determine that the user is "touching" the document, e.g. the user is contacting the touch-sensitive display 250 at a location that is displaying a portion of the document. In some embodiments, however, the user may contact a touch-sensitive input device that is distinct from the display 250, such as by contacting a separate touchpad. The software application may interpret some such contacts as being "touches" on the displayed electronic document, despite the contact occurring at a location different than the displayed electronic document.

In some embodiments, the software application may determine a sequence of contacts based on contact data from the touch-sensitive input device. For example, the software application may determine that the user is moving a finger to the left by receiving successive contact data information over time from the touch-sensitive input device. In some embodiments, the software application may not determine a gesture, but rather may use each separate contact data point (or points) to determine individual interactions with the electronic document. For example, in one embodiment, such as may be seen in FIG. 5A, the user contacts the electronic document at two locations 520*a,b* using two fingers, and moves the two fingers together, such as in a pinching motion. In some embodiments, the software application may recognize this gesture as a "zoom" gesture, but in some embodiments, the software application may not attempt to determine a gesture, but rather may use the locations of the moving contact points as interactions with the "paper" on which the electronic document is displayed.

For example, in the embodiment shown in FIG. 5A, as the user drags the two contact points 520*a,b* towards each other, the software application may interpret the user's contacts as attempts to deform the "paper" of the electronic document. Thus, the software application determines that the contact points on the "paper" "stick" to the user's fingers at the initial contact points 520a,b, and as the user draws the two contact points together, the two contacted points on the paper itself move close together, which causes the paper itself to deform, e.g. it may wrinkle or buckle and the region of paper between the two contact points may be pushed "upwards," as one might expect a sheet of paper to do when manipulated in such a way. Similarly, as may be seen in FIGS. 1A-C, 4A-B, and 5A-C, the software application does not necessarily determine a gesture (e.g. a swipe, or a press) when the user interacts with the electronic document, but rather simulates the user's touches and movements as though the touches and movements were interactions with a sheet of paper. Thus, contacting an electronic document with two fingers at two different contact points, and sliding the contact points away from each other, or past each other (e.g. as may be seen in FIG. 4B), may result in the paper stretching or tearing. Or, as may be seen in FIGS. 1A-C, a pinching motion may result in a folding of the simulated paper.

To accurately simulate the paper, parameters related to the paper may be employed, such as elasticity, resilience, weight, and others discussed in more detail above. For example, as a user slides two contact points away from each other, if the paper has a high resilience characteristic, the paper may stretch somewhat before tearing, or may not tear at all. The user may then re-perform the tearing gesture using four fingers—two "pulling" in each direction—to emulate an increased force applied to the paper. Thus, interactions may be affected both by the type of movement, or types of relative movement, of contact points, the interactions may also be affected by other parameters, such as sensed pressures, which may increase or decrease a "force" of an interaction. For example, a sensed high pressure (or pseudo-pressure), maybe interpreted as assigning a greater force to a particular contact location, while a sensed low pressure (or pseudo-pressure) may be interpreted as a lesser force. For example, in one embodiment, a linear correlation may be established based on sensed pressures (or pseudo-pressures) with a corresponding scale of forces.

Pseudo-pressures have been mentioned and may be used in embodiments where a touch-sensitive input device may not or does not provide actual pressure information, e.g. a measurement of force applied to the touch-sensitive input device. Pseudo-pressures may be generated based on sizes of contact areas. For example, a large contact area may be interpreted as having a greater "pressure" than a small contact area. In some embodiments, touch sensitive input devices may report a "pseudo-pressure" value rather than a true pressure value. However, for purposes of the present disclosure it may be possible to use either or both types of information when determining interactions with an electronic document.

As discussed above, a user may interact with an electronic document to cause a "folding" of a page of an electronic document. For example, as discussed with respect to FIGS. 1A-C, a user may fold a corner of a page to "dog-ear" the page for later reference. However, paper may "fold" in other ways. For example, a user may touch a finger near the right edge of a page of an electronic document and drag her finger to the left, such as to turn the page of the book. In another embodiment, a user may interact with an electronic document that comprises a map. A user may attempt to fold the map into a smaller form factor, similar in concept to how traditional maps (e.g. road maps) may be folded from a relatively large size into a small, portable-sized form factor. The user may touch and drag portions of the document to fold it over onto itself. To do so, the user may zoom the view of the document such that the entire map is visible on the display screen, or the user may select a portion of a large map to "cut" and create a smaller map of an area of interest, which may then be displayed on the screen. The user may then touch and drag different portions of the map to fold, or repeatedly fold, the map. As will be discussed in greater detail below, such folding may generate metadata or initiate access of metadata based on the "paper" on which the map is printed. Such information may affect the resistance of the map to continued folding, provide crease information relating to previous folds (which may be used to provide guidance to a user as may be the case with a traditional folding map), or to provide a sense of increased thickness as the map is folded.

In some embodiments, the software application may recognize the interaction as a "page turn" gesture, e.g. based on the location of the initial contact and the swipe of the contact point to the left. However in some embodiments, the software application may determine that the displayed portion of the electronic document contacted by the user moves as the user moves her finger, thus deforming the electronic document. In an embodiment where the electronic document comprises an electronic book and the paper emulates a page in the book, the user's movements may cause the page of the book to begin to fold as though the page were being turned. As the user moves her finger further to the left, the further the edge of the paper folds over the rest of the page. Thus, when the user releases the page, such as by lifting her finger, the software application may then determine whether the page is sufficiently folded over to cause the page to turn, or whether the page will unfold (or unfurl) and return to its original location, e.g. the user did not move the page far enough to turn to the next page. Such an interaction may provide a sense of realism when interacting with "pages" of an electronic document: the pages act like physical pages.

In addition to emulating interactions with the "paper" of the electronic document, the system may also recognize gestures that are independent of interactions with the paper. For example, the software application may recognize swiping gestures of one or more fingers moving in a substantially uniform direction. Or may recognized pinching or "spreading" gestures (e.g. contact points moving toward each other or away from each other), as gestures to increase or decrease the displayed "zoom" of a portion of the electronic document. In some embodiments, gestures may be used in combination with non-gesture interactions.

For example, in one embodiment, a user may wish to cut a sheet of paper, rather than tear it. To do so, the user may touch the displayed portion of an electronic document and perform a "press" gesture to trigger a "cut" or "razor" function. The software application recognizes the "press" gesture and initiates the "cut" function. The user may then drag his finger along the electronic document to cut a portion of the document (such as to paste it in another location, or to redact it from the document). While the user is dragging his finger, the software application may not recognize a drag gesture, but rather may simply interpret the interaction based on the changing location of the contact point to cause the electronic document to be "cut."

After determining an interaction with an electronic document, the method proceeds to block 712, though in some embodiments, the method may return to block 706 instead of proceeding to block 712

In block 712, the software application generates and outputs a haptic signal. As a user interacts with an electronic book, a software application may generate haptic effects associated with the interactions. For example, if a user touches a touch-sensitive input device at a location corresponding to a portion of the electronic document, the software application may generate a frictional haptic effect and output a haptic signal to a haptic output device (e.g. haptic output device 240 or 260) to provide a tactile sensation to the user to simulate touching a piece of paper. Such haptic effects may be generated based on metadata associated with the electronic document. For example, a "feel" of a piece of paper may be based on metadata parameters such as the age, weight, thickness, and material of the paper. In some embodiments, a haptic output device may be configured to deform a contact surface of a touch-sensitive input device.

In some embodiments, the software application may generate haptic effects associated with other interactions with an electronic document. For example, as discussed above, if a user contacts the electronic document in two locations and moves the two contact locations away from each other, the software application may determine that the gesture results in the paper tearing. In addition, the software application may generate haptic effects associated with such an interaction. For example, as the user spreads the contact points, the software application may generate frictional haptic effects, such as frictional effects that increase in magnitude to emulate the paper resisting tearing. In embodiments that are not able to provide frictional effects, such effects may be emulated, such as by outputting vibrations to correspond to a frictional force. For example, rather than increasing the friction, a haptic output device may start a low magnitude vibration and increase the magnitude as the paper stretches, until it begins to tear.

Once the paper begins to "tear," the software application may reduce the frictional effect and may generate, in addition, a vibrational effect to emulate the feel of the paper being torn. In one embodiment, a vibration to emulate tearing may have a vibration parameter based on the speed at which the user is tearing the paper. For example, if the paper is being torn slowly, the vibration may have a low frequency, while paper being torn quickly may result in a vibration of high frequency. By providing such haptic effects, the software application may provide a more realistic and immersive interaction with the electronic document. Or, as discussed above, in embodiments lacking the ability to providing frictional effects, the vibration to emulate the tearing paper may be output alone, or in conjunction with other effects as will be discussed in more detail below.

As discussed above, in addition to interactions with the paper of the electronic document, the software application may recognize gestures based on contact data, such as swipes, scrolls, etc. These gestures may be used instead of, or in addition to, the non-gesture interactions described above. As was discussed above, a user may "press" at a location within an electronic document to initiate a "cut" function and may then drag a finger to "cut" a portion out of an electronic document. The software application, after recognizing the "press" gesture, may then output a haptic effect, such as a short vibration, to indicate that the "cut" function has been activated. Then, as the user drags his finger along the document, the software application may generate and output a low magnitude vibration to emulate the cutting of the paper of the electronic document. In some embodiments, the vibration may be accompanied by, or replaced by, a frictional haptic effect to emulate resistance to the cutting of the paper.

In another example, if a user touches the right edge of a page of an e-book and drags the contact left, the software application may detect a "drag" gesture and associate a "page turn" effect with the gesture and turn the page. In addition to determining the gesture, the software application may output a haptic effect associated with the non-gesture interaction. For example, the software application may output frictional or vibrational effects related to the movement and folding of the paper. In addition, or instead, the software application may output a haptic effect to indicate that the gesture has been recognized and a function will be executed. For example, if the user moves his finger in a swiping motion, a haptic effect may be output to indicate that a "panning" gesture has been detected and the display may change to pan to a different portion of the electronic document, such as a different region of a map.

In some embodiments, the gesture may be used in conjunction with the non-gesture interaction. For example, as the user drags the edge of the page to the left, the software application detects the drag gesture, but does not execute the page turn action immediately. Rather, the software application continues to allow the user's non-gesture interaction with the page to proceed, thus allowing the user to see the page fold over as the user drags her finger. However, once the user lifts her finger, the software application, based on the "drag" gesture, automatically causes the page turn to occur, such as by causing the display of the paper to continue to fold over until it has turned completely. In one such embodiment, haptic effects may be generated and output based on both the non-gesture interaction and the detected gesture. For example, a haptic effect may be generated and output to emulate the feel of paper sliding past other paper, or paper tearing, and in addition, a haptic effect may be generated and output to indicate a function being executed, such as a zoom function or a page-turn function. Thus, the user may experience both immersive effects to emulate the paper of the electronic document itself, as well as information that communicates functions being executed based on the user's interaction with the electronic document.

In addition to haptic effects, other effects may be generated and output as well. For example, interactions with electronic documents may result in audible responses as well as tactile sensations. For example, in one embodiment, as a user interacts with a portion of an electronic document, a sound associated with paper sliding on other paper may be generated and output. For example, in one embodiment, a pre-recorded sliding effect may be played. In some embodiments, a plurality of pre-recorded audible effects may have been recorded and one may be selected and played based on metadata parameters associated with the electronic document, such as paper type, paper thickness, paper material, etc. Or one audio effect may be selected from the full set, or a subset of the pre-recorded effects (e.g. a subset determined based on metadata about the electronic document), at random, thus providing a slightly varying audible response each time the user term turns a page, tears a piece of paper, pans along a large document, etc. While some embodiments may use pre-recorded audio to provide audible feedback, some embodiments may dynamically generate audible responses. For example, in one embodiment, a software application may simulate an audio response by modeling the paper, or a portion of the paper, and vibrational characteristics of the paper, such as by using a physical modeling synthesis algorithm to model paper fibers or large components of a sheet of emulated paper.

After the software application generates and outputs haptic effects, or other effects, the method proceeds to block 714, though in some embodiments, the method may return to block 706 instead of proceeding to block 714.

In block 714, the software application generates metadata associated with the interaction. As was discussed above, interactions with an electronic document may alter the appearance or contents of the electronic document. For example, a user may "dog-ear" a page of the document, or may cut a portion out of the document. To retain such alterations, the software application may generate and store metadata related to interactions with the electronic document. For example, in one embodiment, the software application may generate and store metadata relating to folds made in one or more portions of the electronic document. Such metadata may be stored within the electronic document itself, or may be stored in files associated with the electronic document. In addition, metadata may be generated and stored that allows easy access to such alterations. For example, folds may be stored as metadata, but additional metadata may be stored to indicate folds that are likely "dog-ears," such as folds that include a corner of a page of the electronic document. Such metadata may allow a search functionality of the software application to easily categorize different alterations (e.g. cuts, pastes, folds, dog-ears, etc.) for easy identification at a later time. After generating metadata associated with one or more interactions, the method returns to block 706 where the document is redisplayed based on the determined interactions.

While the methods and systems herein are described in terms of software executing on various machines, the methods and systems may also be implemented as specifically-configured hardware, such as field-programmable gate array (FPGA) specifically to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
receiving an electronic document comprising a plurality of pages;
receiving metadata indicating a type of paper associated with the electronic document;
associating the metadata with the electronic document based on a second characteristic associated with the electronic document;
generating and transmitting a display signal configured to cause display of the at least a portion of the electronic document;
in response to a multi-page turn gesture on a touch sensitive input device, performing a multi-page turn by causing multiple pages of the plurality of pages to turn in succession; and
generating and transmitting a haptic signal in response to a particular page of the plurality of pages being passed during the multi-page turn, the haptic signal configured to cause a haptic output device to output a haptic effect.

2. The method of claim 1, further comprising:
receiving contact data based on an interaction with the touch sensitive input device, the contact data associated with the portion of the electronic document;
determining a gesture based on the contact data;
determining a deformation of the portion of the document based on the gesture;
generating and transmitting a second display signal configured to cause display of the portion of the document comprising the deformation; and
generating and transmitting a second haptic signal based on the type of paper and the deformation, the second haptic signal configured to cause the haptic output device to generate a second haptic effect, the second haptic effect configured to indicate the deformation.

3. The method of claim 2, wherein the gesture comprises a page-turn gesture or the multi-page turn gesture, the deformation is based on the gesture and the metadata, and the second haptic effect comprises texture or a change in friction.

4. The method of claim 3, wherein the contact data comprises pressure data, and the change in friction is based on the pressure data.

5. The method of claim 3, further comprising generating and transmitting an audio signal based on the gesture and the metadata.

6. The method of claim 3, wherein the multi-page turn gesture comprises a scrub gesture, and transmitting the second haptic signal comprises transmitting the second haptic signal for each page of the electronic document accessed by the scrub gesture comprising the deformation.

7. The method of claim 3, wherein determining the gesture is further based on the metadata.

8. The method of claim 2, wherein the gesture comprises a folding gesture, the deformation comprises a folding of the portion of the document, and the second haptic effect comprises a texture or a change in friction.

9. The method of claim 8, wherein the folding deformation is configured to simulate the size and shape of the fold based on the gesture and the metadata.

10. The method of claim 2, wherein the gesture comprises a cut gesture, the deformation comprises a cutting of the portion of the document, and the second haptic effect comprises a vibration.

11. The method of claim 1, wherein the metadata further comprises at least one of a roughness characteristic, a color characteristic, weight characteristic, an age characteristic, a brittleness characteristic, or a compliance characteristic.

12. A non-transitory computer-readable medium comprising program code configured to be executed by a processor, the program code configured to:

receive an electronic document comprising a plurality of pages;

receive metadata associated with the electronic document;

associate the metadata with the electronic document;

generate and transmit a display signal configured to cause display of the at least a portion of the electronic document;

in response to a multi-page turn gesture on a touch sensitive input device, perform a multi-page turn by causing multiple pages of the plurality of pages to turn in succession; and generate and transmit a haptic signal in response to a particular page of the plurality of pages being passed during the multi-page turn, the haptic signal configured to cause a haptic output device to output a haptic effect.

13. The non-transitory computer-readable medium of claim 12, wherein the program code is further configured to:

receive contact data based on an interaction with the touch sensitive input device, the contact data associated with the portion of the document;

determine a gesture based on the contact data;

determine a deformation of the portion of the document based on the gesture;

generate and transmit a second display signal configured to cause display of the portion of the document comprising the deformation; and generate and transmit a second haptic signal based on a type of paper associated with the electronic document and the deformation, the second haptic signal configured to cause the haptic output device to generate a second haptic effect, the second haptic effect configured to indicate the deformation.

14. The non-transitory computer-readable medium of claim 13, wherein the gesture comprises a page-turn gesture or the multi-page turn gesture, the deformation is based on the gesture and the metadata, and the second haptic effect comprises texture or a change in friction.

15. The non-transitory computer-readable medium of claim 14, wherein the contact data comprises pressure data, and the change in friction is based on the pressure data.

16. The non-transitory computer-readable medium of claim 14, wherein the program code is further configured to generate and transmit an audio signal based on the gesture and the metadata.

17. The non-transitory computer-readable medium of claim 14, wherein the multi-page turn gesture comprises a scrub gesture, and wherein the program code is further configured to:

transmit the second haptic signal for each page of the electronic document accessed by the scrub gesture comprising the deformation.

18. The non-transitory computer-readable medium of claim 14, wherein the program code is further configured to determine the gesture based at least in part on the metadata.

19. The non-transitory computer-readable medium of claim 13, wherein the gesture comprises a folding gesture, the deformation comprises a folding of the portion of the document, and the second haptic effect comprises a texture or a change in friction.

20. The non-transitory computer-readable medium of claim 19, wherein the folding deformation is configured to simulate the size and shape of the fold based on the gesture and the metadata.

21. The non-transitory computer-readable medium of claim 13, wherein the gesture comprises a cut gesture, the deformation comprises a cutting of the portion of the document, and the second haptic effect comprises a vibration.

22. The non-transitory computer-readable medium of claim 12, wherein the metadata comprises at least one of a roughness characteristic, a color characteristic, weight characteristic, an age characteristic, a brittleness characteristic, or a compliance characteristic associated with the electronic document.

23. A system comprising:
a computer-readable medium;
a touch-sensitive input device;
a display; and
a processor in communication with the computer-readable medium, the touch-sensitive input device, and the display, the processor configured to:
receive an electronic document comprising a plurality of pages;
generate and transmit a display signal configured to cause display of the at least a portion of the electronic document;
in response to a multi-page turn gesture on the touch-sensitive input device, perform a multi-page turn by causing multiple pages of the plurality of pages to turn in succession; and
generate and transmit a haptic signal in response to a particular page of the plurality of pages being passed during the multi-page turn, the haptic signal configured to cause a haptic output device to output a haptic effect.

24. The system of claim 23, wherein the processor is further configured to:
receive contact data based on an interaction with the touch-sensitive input device, the contact data associated with the portion of the document;

determine a gesture based on the contact data;
determine a deformation of the portion of the document based on the gesture;
generate and transmit a second display signal configured to cause display of the portion of the document comprising the deformation; and
generate and transmit a second haptic signal based on a type of paper associated with the electronic device and the deformation, the second haptic signal configured to cause the haptic output device to generate a second haptic effect, the second haptic effect configured to indicate the deformation.

25. The method of claim 1, further comprising:
transmitting the metadata to, or downloading the metadata from, a remote device.

26. The method of claim 1, wherein the metadata comprises a visual characteristic associated with the electronic document, the visual characteristic comprising a blemish, a reflectiveness, or a color change parameter.

27. The method of claim 1, further comprising:
responsive to a passage of time, generating updated metadata configured to simulate virtual wear and tear of the electronic document over the period of time.

28. The method of claim 1, wherein:
receiving the metadata comprises receiving the metadata from a remote device; and
associating the metadata with the electronic document based on the second characteristic comprises associating the received metadata with the electronic document based on the type of paper, a filename of the electronic document, or information within the electronic document.

29. The method of claim 1, wherein the particular page is a predetermined page of the electronic document, and further comprising:
determining the particular page based at least in part on the metadata prior to transmitting the haptic signal.

* * * * *